US010271643B2

(12) United States Patent
Yamamoto et al.

(10) Patent No.: US 10,271,643 B2
(45) Date of Patent: Apr. 30, 2019

(54) FURNITURE DEVICE WITH HEIGHT-ADJUSTABLE TOP BOARD

(71) Applicant: OKAMURA CORPORATION, Yokohama-shi, Kanagawa (JP)

(72) Inventors: Takayuki Yamamoto, Yokohama (JP); Takayuki Sakimoto, Osaka (JP)

(73) Assignee: OKAMURA CORPORATION, Kanagawa (JP)

( * ) Notice: Subject to any disclaimer, the term of this patent is extended or adjusted under 35 U.S.C. 154(b) by 0 days.

(21) Appl. No.: 15/739,932

(22) PCT Filed: Jun. 30, 2016

(86) PCT No.: PCT/JP2016/069476
§ 371 (c)(1),
(2) Date: Dec. 26, 2017

(87) PCT Pub. No.: WO2017/006835
PCT Pub. Date: Jan. 12, 2017

(65) Prior Publication Data
US 2018/0184800 A1    Jul. 5, 2018

(30) Foreign Application Priority Data
Jul. 3, 2015   (JP) .................................. 2015-134700

(51) Int. Cl.
*A47B 21/02* (2006.01)
*A47B 9/00* (2006.01)
(Continued)

(52) U.S. Cl.
CPC ................ *A47B 21/02* (2013.01); *A47B 9/00* (2013.01); *A47B 9/20* (2013.01); *A47B 13/00* (2013.01);
(Continued)

(58) Field of Classification Search
CPC ...... A47B 2200/008; A47B 2200/0081; A47B 21/00
(Continued)

(56) References Cited

U.S. PATENT DOCUMENTS 4,658,577 A * 4/1987 Klein ................... H02G 11/006
248/49
4,785,742 A * 11/1988 Esslinger ............... A47B 17/02
108/101
(Continued)

FOREIGN PATENT DOCUMENTS

DE   102009053754 A1   5/2011
JP   B-3371959   1/2003
(Continued)

OTHER PUBLICATIONS

Notification to Applicant dated Feb. 13, 2018 issued in Japanese Applicaiton No. 2016-127663.
(Continued)

*Primary Examiner* — Jose V Chen
(74) *Attorney, Agent, or Firm* — Nixon Peabody LLP; Jeffrey L. Costellia

(57) ABSTRACT

A furniture device (1) with a height-adjustable top board includes a top board; extendable and contractable legs equipped with an upper support configured to support the top board, and a lower support configured to support the upper support to be movable upward and downward; and a decorative member (18) which covers the lower support (9A) of the legs. An arbitrary color is given to the decorative member.

7 Claims, 11 Drawing Sheets

(51) Int. Cl.
  *A47B 13/00* (2006.01)
  *A47B 97/00* (2006.01)
  *A47B 9/20* (2006.01)
  *F16L 3/015* (2006.01)

(52) U.S. Cl.
  CPC .............. *A47B 97/00* (2013.01); *F16L 3/015* (2013.01); *A47B 2097/003* (2013.01); *A47B 2200/0054* (2013.01); *A47B 2200/0056* (2013.01); *A47B 2200/0062* (2013.01)

(58) Field of Classification Search
  USPC ..................................................... 108/50.02
  See application file for complete search history.

(56) References Cited

U.S. PATENT DOCUMENTS

| | | | | |
|---|---|---|---|---|
| 4,852,500 | A * | 8/1989 | Ryburg | A47B 21/03 108/105 |
| 5,394,809 | A * | 3/1995 | Feldpausch | A47B 9/00 108/147.21 |
| 5,588,376 | A * | 12/1996 | Seidl | A47B 17/033 108/106 |
| 5,638,759 | A * | 6/1997 | Klugkist | A47B 13/003 108/23 |
| 5,988,076 | A * | 11/1999 | Vander Park | A47B 21/06 108/50.02 |
| 6,003,447 | A * | 12/1999 | Cox | A47B 3/0815 108/132 |
| 6,595,144 | B1 * | 7/2003 | Doyle | A47B 9/00 108/147 |
| 6,960,098 | B1 * | 11/2005 | Tseng | A47B 21/06 108/50.02 |
| 7,593,217 | B2 * | 9/2009 | Shahrokhi | F16G 13/16 248/317 |
| 7,612,999 | B2 * | 11/2009 | Clark | A61B 5/0002 248/918 |
| 7,640,866 | B1 | 1/2010 | Schermerhorn | |
| 8,196,526 | B2 * | 6/2012 | Rheault | A47B 13/10 108/50.01 |
| 9,433,282 | B2 * | 9/2016 | Steelman | A47B 13/02 |
| 9,585,468 | B2 * | 3/2017 | Udagawa | H02G 3/0487 |
| 9,936,802 | B1 * | 4/2018 | Newhouse | A47B 21/06 |
| 2007/0044690 | A1 * | 3/2007 | Lee | A47B 81/06 108/50.02 |
| 2007/0227409 | A1 * | 10/2007 | Chu | A47B 21/00 108/50.02 |
| 2010/0213679 | A1 * | 8/2010 | Smith | A47B 21/00 280/47.35 |
| 2012/0312196 | A1 * | 12/2012 | Newkirk | H02J 7/025 108/23 |
| 2014/0096706 | A1 | 4/2014 | Labrosse et al. | |
| 2014/0331901 | A1 * | 11/2014 | Seefeldt | A47B 21/06 108/50.02 |
| 2017/0141597 | A1 * | 5/2017 | Mifsud | H02J 7/0004 |

FOREIGN PATENT DOCUMENTS

| | | |
|---|---|---|
| JP | B-3391285 | 3/2003 |
| JP | A-2005-131281 | 5/2005 |
| JP | A-2007-275211 | 10/2007 |
| JP | A-2007-325809 | 12/2007 |
| JP | U-B-3164739 | 12/2010 |
| JP | B-4846347 | 12/2011 |
| JP | A-2012-100746 | 5/2012 |
| JP | A-2014-113505 | 6/2014 |
| WO | WO-2013/037072 | 3/2013 |

OTHER PUBLICATIONS

International Search Report for PCT/JP2016/069476 dated Aug. 30, 2016.

* cited by examiner

FURNITURE DEVICE WITH HEIGHT-ADJUSTABLE TOP BOARD

TECHNICAL FIELD

The present invention relates to a furniture device such as a desk device or a table device with a height-adjustable top board which is installed in an office space such as an office, a hospital, and a public facility and in which a height of a top board is adjustable in a vertical direction.

Priority is claimed on Japanese Patent Application No. 2015-134700, filed Jul. 3, 2015, the content of which is incorporated herein by reference.

BACKGROUND ART

In the related art, in an office space such as an office, a hospital, and a public facility, in order to provide a working area to the office, a desk device, a table device and the like are generally disposed. When installing a desk device, for example, in the office space, a top board height of the desk device at which it is easy to work differs depending on the physical size, sex, preferences, and the like of the office worker. Since with a desk device having a fixed top board height, it is not possible to cope with such circumstances, a desk device that allows the height of the top board to be adjusted in a vertical direction is used.

By utilizing such a desk device with a height-adjustable top board, it is possible to provide a working area having a height of a top board depending on the preferences of an office worker. Thus, it is possible to improve the working efficiency and to reduce the burden on the worker's body.

In a conventional desk device, for example, a method of using a gas spring, a method of using a gear, or the like described in Patent Document 1 and 2 has been proposed as lifting and lowering means for changing the height of the top board in a vertical direction. According to the lifting and lowering means, the structure is relatively simple and the costs are low.

However, in this manual lifting and lowering means, in some cases, it may be difficult for an office worker with a low strength to operate an operation unit. Also, when performing work at the height of a top board that does not suit the preferences of the office worker, there is a possibility of deterioration in a working posture.

As a means for solving such a problem, in order to improve the operability of the desk device, a desk device equipped with an electric drive unit as described in, for example, Patent Document 3 to 5 are often adopted. According to this electric desk device, the worker can easily adjust a height of the top board to be suitable.

In a desk device with a height-adjustable top board equipped with an electric drive unit, since it is necessary to supply electric power from a commercial power supply provided in the office space to a drive unit provided in a desk main body, it is required to draw a power supply cable into the desk main body. In many cases, the drive unit of the electric drive unit is installed in the top board, the back side of the top board, or the like.

In these cases, the power supply cable of the drive unit provided in the vicinity of the top board is suspended therefrom to the floor surface, and is connected to a commercial power supply.

CITATION LIST

Patent Document

[Patent Document 1]
  Japanese Patent No. 3371959
[Patent Document 2]
  Japanese Patent No. 3391285
[Patent Document 3]
  Japanese Utility Model Registration No. 3164739
[Patent Document 4]
  Japanese Patent No. 4846347
[Patent Document 5]
  Japanese Unexamined Patent Application, First Publication No. 2014-113505

SUMMARY OF INVENTION

Technical Problem

In a place where the aforementioned desk device is used, for example, for each floor or for each partitioned space in the hospital, or in each floor or in a partitioned space, there are cases in which it is necessary to identify a department or a subject type of a hospital room. Also, in offices and the like, there are cases where it is necessary to identify the details of the office work performed in each floor, for each partitioned space, or in each floor or in a partitioned space.

Further, in the aforementioned electric desk device, since the height of the top board can be changed in the vertical direction, the suspended power supply cable moves up and down in accordance with the lifting and lowering motion of the top board. Thus, there is a possibility that the power supply cable may catch on other articles disposed around or below the top board of the desk device. Also, when a worker performs work, there is a possibility that the body, feet, or the like of the worker may touch the power supply cable.

Furthermore, since the electric drive unit has a built-in drive mechanism therein, it is difficult to add further process when mounting the wiring duct on the power supply cable in the vicinity of the electric drive unit.

The present invention has been made in view of the above problems, and an object thereof is to provide a furniture device with a height-adjustable top board, in which the type or details of office work or subjects for each floor, for each partitioned space, or in each floor or partitioned space is able to be identified, using a simple method.

Another object of the present invention is to provide a furniture device with a height-adjustable top board capable of being operated with a simple structure without a possibility of a worker or surrounding articles coming into contact with the power supply cable.

Solution to Problem

A furniture device with a height-adjustable top board according to the present invention includes a top board; extendable and contractable legs equipped with an upper support configured to support the top board, and a lower support configured to support the upper support to be movable upward and downward; and a decorative member which covers the lower support, wherein an arbitrary color is given to the decorative member.

By coloring the decorative member in different colors in accordance with the identification targets such as the type or details of office work or subjects for each floor or for each space, or in each floor or partitioned space, it is possible to easily identify the above-mentioned identification targets by the color without directly coloring the legs themselves of the desk device. Therefore, a usability of such furniture can be improved.

Also, since the decorative member can be mounted without adding further process to the lower support, it is possible to reduce the number of processes and the processing costs required for mounting the decorative member.

In this case, it is preferable that substantially the entire periphery of the lower support be covered with the decorative member.

This makes it possible to identify the color of the decorative member irrespective of from which direction the outer periphery of the lower support is viewed, and a usability of such a furniture device is further improved.

In addition, the furniture device with a height-adjustable top board according to the present invention includes a top board having a working surface on an upper surface thereof; extendable and contractable legs equipped with an upper support configured to support the top board and a lower support configured to support the upper support to be movable upward and downward; a mounting portion mounted on the lower support; and a wiring accommodating portion which is mounted on the mounting portion and accommodates wiring extending from the top board side.

By accommodating the wiring hanging downward from the top board side and extending to the lower support of the legs in the wiring accommodating portion connected to the mounting portion, it is possible to guide and extend the wiring to the floor surface side along the lower support without adding further process to the legs. Therefore, when the top board moves up and down, the wiring is displaced while being bent in accordance with lifting and lowering of the top board, and the wiring can be held along the wiring accommodating portion connected to the lower support on the floor surface side. Therefore, it is possible to prevent the wiring from coming into contact or becoming tangled with an office worker or an article or the like in the vicinity of the leg.

In addition, the furniture device with a height-adjustable top board according to the present invention preferably includes a wiring guide portion which accommodates the wiring extending from the top board to the wiring accommodating portion and is displaceable, while being bent in accordance with lifting and lowering of the top board, and the wiring guide portion is preferably mounted on the mounting portion or the wiring accommodating portion.

By mounting the lower end portion of the wiring guide portion on the mounting portion or the wiring accommodating portion, the wiring guided in the wiring guide portion is reliably guided downward within the wiring accommodating portion connected to the mounting portion. As a result, it is possible to prevent the wiring from coming into contact or becoming tangled with an office worker located on the floor surface or an article or the like in the vicinity of the legs.

Further, an engaging portion provided in the wiring accommodating portion may be engaged with a locking portion provided in the mounting portion.

By engaging the engaging portion of the wiring accommodating portion with the locking portion of the mounting portion mounted on the lower support, the wiring accommodating portion is fixed by the lower support of the leg, and the wiring can be guided by the wiring accommodating portion along the lower support.

In addition, the mounting portion may surround substantially the entire periphery of the lower support, and one of the locking portion provided in the mounting portion and the engaging portion provided in the wiring accommodating portion may be a slit, and the other may be a locking claw portion which is engageable with the slit.

By engaging the locking claw portion with the slit, the wiring accommodating portion can be held in the mounting portion which surrounds substantially the entire periphery of the lower support.

Advantageous Effects of Invention

According to the furniture device with a height-adjustable top board of the present invention, it is possible to easily identify the type, the details or the like of the office work or subjects for each floor or for each partitioned space, or in each floor and partitioned space using a simple method.

In addition, according to the furniture device with a height-adjustable top board of the present invention, since the structure is simple, it is easy to install the device, and the wiring can be installed without adding further process to the legs, it is thus possible to reduce the number of processes and the processing costs required for installation of the wiring. Moreover, there is no risk of the wiring coming into contact with an office worker or an article or the like around the furniture device, and high operability and safety can be secured.

DESCRIPTION OF EMBODIMENTS

Figure 1:
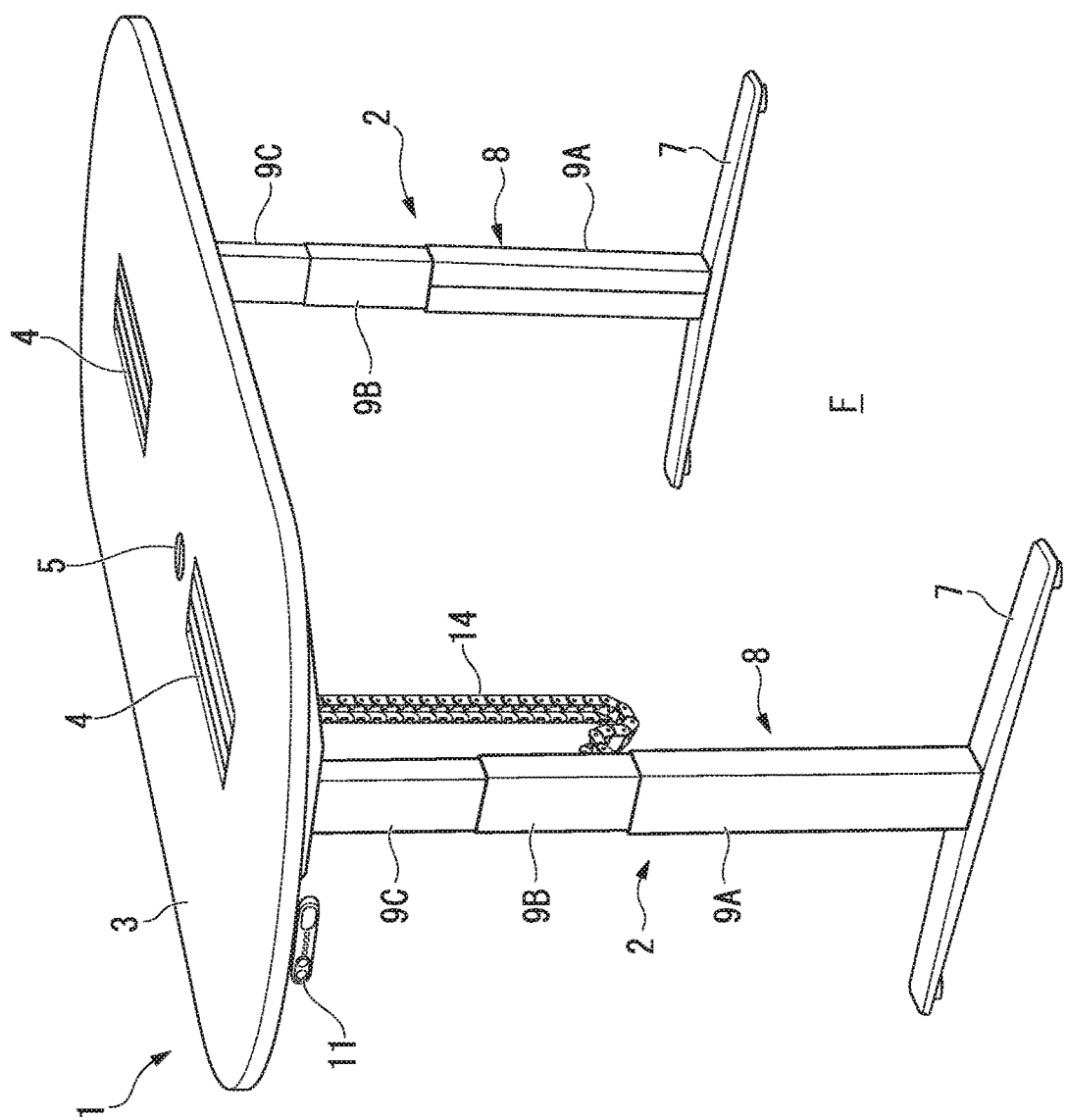
FIG. 1 is a perspective view of major parts showing a desk device with a height-adjustable top board according to a first embodiment of the present invention.

Hereinafter, a desk device 1 with a height-adjustable top board according to an embodiment of the present invention will be described with reference to the accompanying drawings.

FIGS. 1 to 5 show the desk device 1 with a height-adjustable top board according to a first embodiment of the present invention, which is used in, for example, an office room, a conference room, and the like of a hospital, an office, or a public facility. The desk device 1 generally includes, for example, a pair of legs 2 placed on a floor surface F, and a top board 3, for example, having an oval board shape mounted on the top of the legs 2. An upper surface of the top board 3 is, for example, a working surface, and a wiring cover 4, an embedded switch 5, and the like for hiding a power supply socket installed therein are installed at the center of the top board 3.

Figure 2:
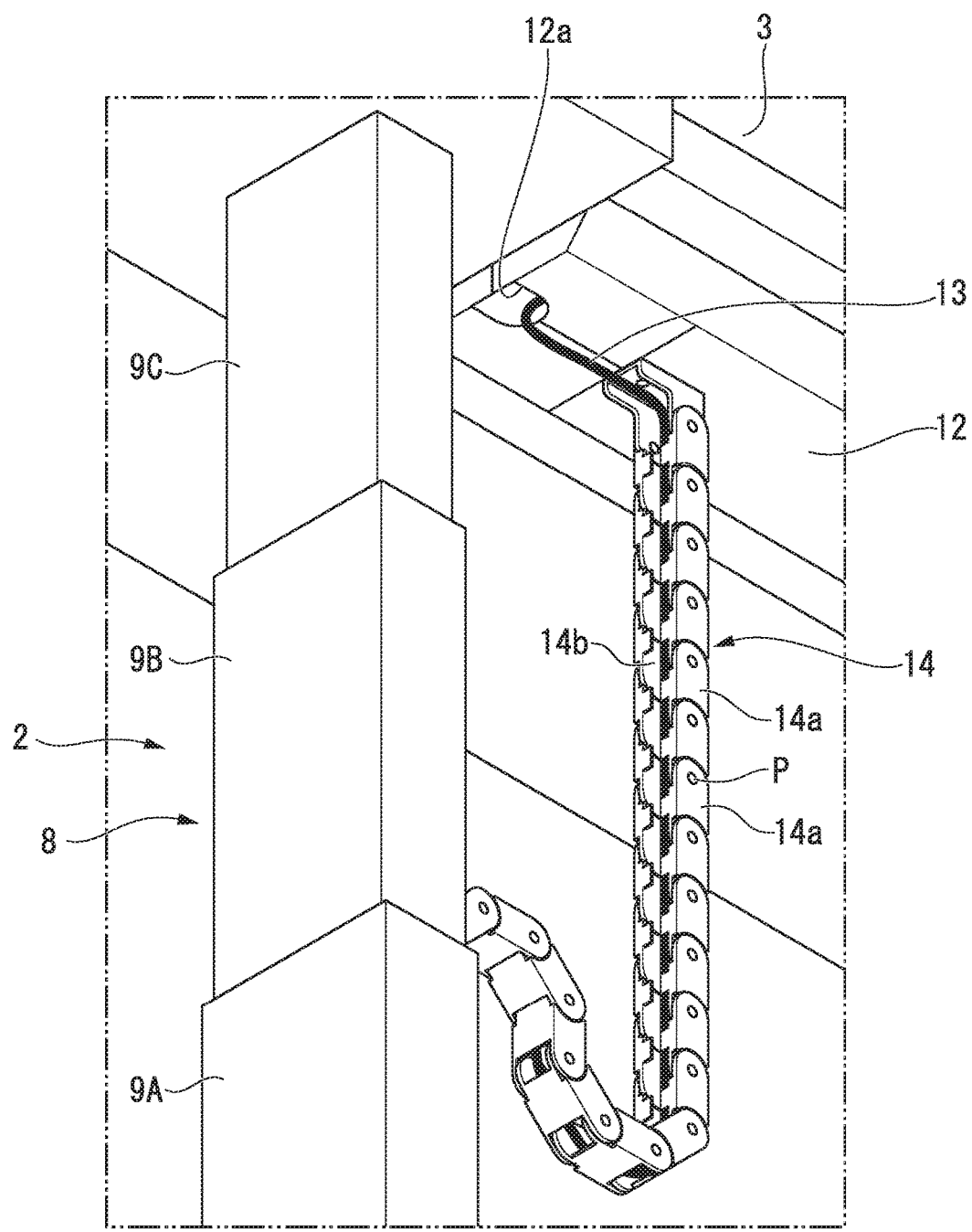
FIG. 2 is a perspective view of a cable protection chain hanging down from the top board shown in FIG. 1 along legs.

In FIGS. 1 and 2, the legs 2 include, for example, long board-like base members 7 provided on the floor surface F, and leg members 8 which stand up from the center of the base member 7 and extend upward to support the top board 3. The leg members 8 have a lower support 9A fixed to the base member 7, an intermediate support 9B accommodated to be movable up and down in a vertical direction from the inside of the lower support 9A, and an upper support 9C accommodated to be movable up and down in the vertical direction from the inside of the intermediate support 9B. The top board 3 is supported at the upper end portion of the upper support 9C.

The lower support 9A, the intermediate support 9B, and the upper support 9C are formed, for example, in the shape of a rectangular tube, but may have a cylindrical shape or the like, and a horizontal cross-sectional shape may be any desired tubular shape. Since the intermediate support 9B and the upper support 9C extend and retract in the vertical direction with respect to the lower support 9A, respectively, the vertical length of the leg member 8 can be adjusted.

Further, in this embodiment, the lower support 9A, the intermediate support 9B, and the upper support 9C are disposed to be extendable and contractable in the vertical direction, as the leg member 8. However, in order to vertically move the top board 3, at least the lower support 9A and the upper support 9C may be included. Alternatively, a plurality of intermediate supports 9B may be provided to be extendable and contractable with each other.

The desk device 1 according to the present embodiment includes a known control unit (not shown) which controls the lifting and lowering motion of the leg member 8, and a drive motor (not shown) which vertically moves the intermediate support 9B and the upper support 9C. Further, an operation unit 11 for inputting a lifting and lowering motion signal to the control unit is installed, for example, on a side part of the top board 3. The control unit is installed inside the accommodation block 12 provided on the lower surface side of the top board 3.

The power supply cable 13 connected to the control unit extends to outside through an opening portion 12a of the accommodation block 12, and is connected to a commercial power supply provided in the office space in which the desk device 1 is installed. The electric power supplied from the commercial power supply via the power supply cable 13 is used for the lifting and lowering motion of the leg member 8, and is also used by an electronic device such as a personal computer installed on the top board 3 or other various devices when connected via a power supply cable, a power supply socket in the wiring cover 4, the embedded switch 5 or the like.

The power supply cable 13 extends to outside from the opening portion 12a of the accommodation block 12 in the vicinity of one leg member 8, and is held in a cable protection chain 14 provided at a position close to the opening portion 12a of the accommodation block 12 and extending in the vertical direction. In FIG. 2, the cable protection chain 14 is a chain-like member in which a plurality of chain segments 14a having a substantially U-shaped cross section are connected to each other to be sequentially rotatable with a ring pin P. The power supply cable 13 is accommodated in an internal space formed by connecting openings 14b of each chain segment 14a.

An upper end portion of the cable protection chain 14 is supported by a lower surface of the accommodation block 12 of the top board 3 and hangs down. A lower end portion of the cable protection chain 14 is fixed to an upper end portion of a wiring duct 16 to be described later. In addition, the cable protection chain 14 has a surplus length that is equal to or longer than the length from the highest position of the lifting and lowering range of the top board 3 to the wiring duct 16, and the cable protection chain 14 is bent, for example, in a J shape and hangs down. When the top board 3 is lowered, the cable protection chain 14 is displaceable to be greatly bent downward due to its own weight, and the cable protection chain 14 is displaced such that the bent portion becomes smaller due to lifting.

Figure 3:
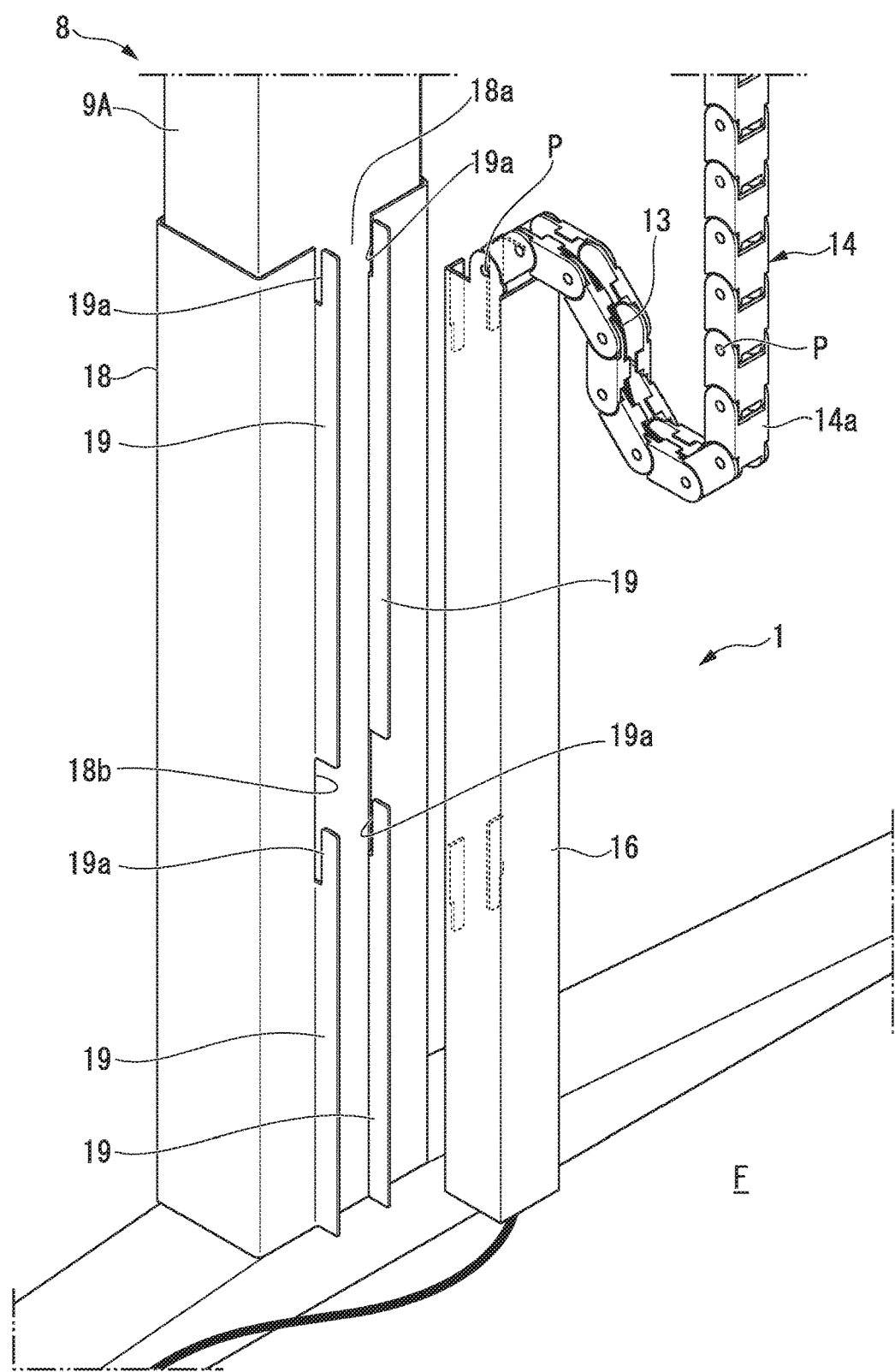
FIG. 3 is an exploded perspective view showing a lower support and a wiring duct of the legs.
Figure 4A:
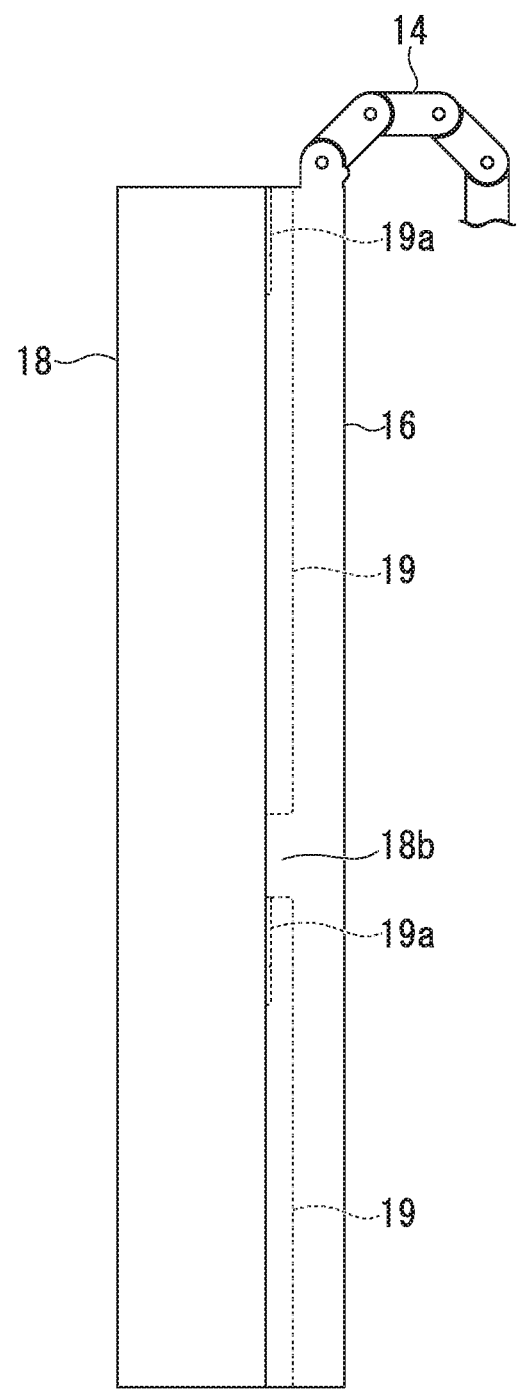
FIG. 4A is a side view in which the wiring duct is connected to a mounting frame mounted on a lower support of the legs.
Figure 4B:
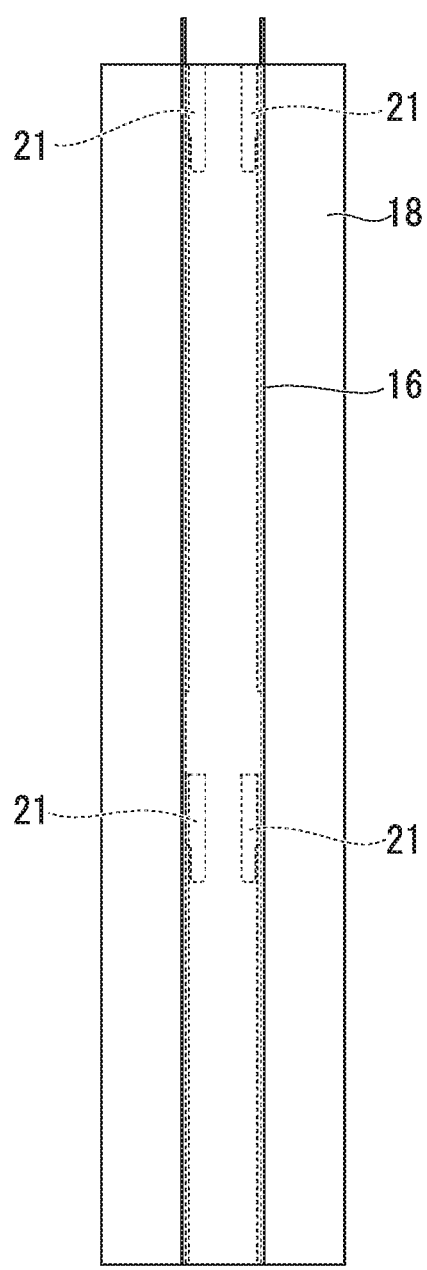
FIG. 4B is a front view in which the wiring duct is connected to the mounting frame mounted on the lower support of the legs.
Figure 5:
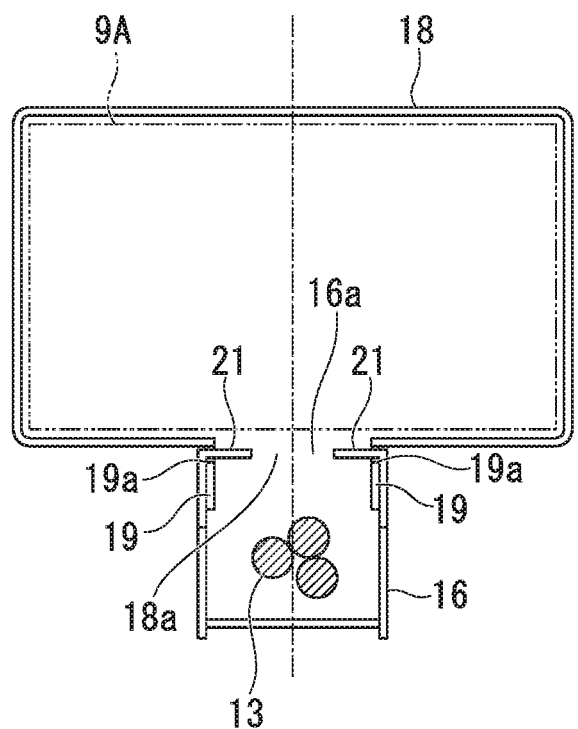
FIG. 5 is an enlarged horizontal cross-sectional view of the mounting frame and the wiring duct shown in FIG. 4.

In FIGS. 3 to 5, an angular tube frame-like mounting frame (a decorative frame) 18 is mounted on the lower support 9A of the leg member 8. The angular tube frame-like mounting frame 18 covers three sides of the rectangular tubular lower support 9A, and has an opening 18a formed at the center of the remaining one surface. A substantially entire circumference of the lower support 9A is covered with the mounting frame 18. On both sides of the opening 18a of the mounting frame 18, a pair of long board-like locking portions 19 are formed to stand up. A slit 19a having a predetermined length is formed at the upper end portion of each of the pair of locking portions 19 along the base thereof.

Further, a notch portion 18b formed by cutting the pair of locking portions 19 is formed at a midway portion of the mounting frame 18 in the vertical direction, and a slit 19a is also similarly formed on the upper portion of the locking portion 19 on the lower side of the notch portion 18b.

In FIGS. 3, 4A, and 4B, the lower end portion of the cable protection chain 14 is pivotally connected to the upper end portion of the wiring duct 16 via a ring pin P. As shown in FIGS. 3 to 5, the wiring duct 16 has an opening 16a formed on the remaining one surface in a substantially U-shaped cross section. Although the length of the wiring duct 16 is substantially equal to the length of the mounting frame 18 here, the lengths may not be the same.

The power supply cable 13 guided through the inside of the cable protection chain 14 is also inserted into the wiring duct 16. The power supply cable 13 is placed on the floor surface F from the lower end portion of the wiring duct 16 and is electrically connectable to a commercial power source of a wall surface or the like.

At both end portions of the opening 16a in the wiring duct 16, a pair of locking claw portions 21 as shown in FIGS. 4A, 4B, and 5 are formed to protrude in a direction of closing the opening 16a. Other than at the upper end portion, a pair of locking claw portions 21 are also formed in the middle in the vertical direction. These two pairs of locking claw portions 21 are provided at positions facing the two vertical locking portions 19 of the mounting frame 18, respectively.

Therefore, by inserting the two pairs of locking claw portions 21 of the wiring duct 16 from the upper ends of the slits 19a of the two pairs of locking portions 19 of the mounting frame 18, as shown in FIGS. 4A, 4B and 5, the wiring duct 16 can be engaged with the mounting frame 18. In the engaged state, the mounting frame 18 and the wiring duct 16 have substantially the same length and are installed at the same position in the vertical direction.

Further, the mounting frame 18 and the wiring duct 16 are colored in the same color. In particular, by having the colors of the mounting frame 18 and the wiring duct 16 as different colors for each of the desk devices 1 with a height-adjustable top board, it is possible to identify colors without directly painting the legs 2 of the desk device 1 for each floor or for each space. For example, in each floor or in a partitioned space in the hospital, depending on the type of coloring applied to the mounting frame 18 and the wiring duct 16, it is possible to conveniently identify the subject types and the like such as a medical department or a hospital room such as internal medicine, orthopedic surgery, and otolaryngology.

Also, in offices and the like, it is easy to identify the details of the office work such as accounting department, the general affairs department, the sales department, and the like within each floor or partitioned space, depending on the type of coloring.

Description will be given of a method of mounting the power supply cable 13 in the desk device 1 with a height-adjustable top board according to the first embodiment having the above-described configuration.

By inserting the mounting frame 18 from the lower part of the lower support 9A or from the upper part of the lower support 9A with the leg member 8 contracted in advance, the mounting frame 18 may be mounted on the lower support 9A.

In FIG. 2, by pushing the power supply cable 13 discharged to the outside from the opening portion 12a of the accommodation block 12 on the lower surface of the top board 3 into the opening 14b of the cable protection chain 14, the power supply cable 13 is accommodated over the entire length of the cable protection chain 14. Further, the chain segment 14a of the lower end portion of the cable protection chain 14 is connected to and supported by the upper end portion of the wiring duct 16 by the ring pin P.

Further, the power supply cable 13 extending downward from the lower end portion of the cable protection chain 14 is inserted from the opening 16a of the wiring duct 16, and is similarly inserted in the vertical direction over the entire length of the wiring duct 16.

In this state, in FIG. 3, the opening 16a of the wiring duct 16 faces the opening 18a of the mounting frame 18 mounted to cover the lower support 9A of the leg member 8, and the locking claw portion 21 as the engaging portion of the wiring pattern 16 is inserted into the slit 19a of the locking portion 19 of the mounting frame 18 from above. As a result, as shown in FIGS. 4A, B and 5, the wiring duct 16 can be engaged with the mounting frame 18.

In this way, even if it is difficult to perform welding or screwing for mounting the power supply cable 13 on the legs 2 of the desk device 1 as described above, the wiring duct 16 can be easily connected to the lower support 9A of the leg member 8.

Next, a method of using the desk device 1 with a height-adjustable top board according to the first embodiment will be described.

In the desk device 1, in a state in which the leg member 8 is extended to hold the top board 3 at the highest position, the intermediate support 9B and the upper support 9C are located at the position of farthest extension and rising with respect to the lower support 9A. In this state, the cable protection chain 14 with the power supply cable 13 accommodated therein is, for example, bent in a J shape as shown in FIG. 2, and is in a state of being connected to the upper end of the wiring duct 16 engaged with the mounting frame 18.

Further, when the top board 3 is lowered by operating an operation button of the operation unit 11, the intermediate support 9B and the upper support 9C are lowered to a predetermined height with respect to the lower support 9A. Since the lower end portion of the cable protection chain 14 is fixed and held at the upper end portion of the wiring duct 16, when the top board 3 is lowered, the bent portion of the cable protection chain 14 is lowered further downward, and the bent portion becomes longer. Then, the power supply cable 13 accommodated in the cable protection chain 14 is also similarly bent.

In this way, when the power supply cable 13 is vertically displaced due to the lifting and lowering of the top board 3, it can be protected due to a change in length (deflection) of the vertical bent portion of the cable protection chain 14. Therefore, it is possible to prevent the power supply cable 13 and the cable protection chain 14 from intertwining with each other, and to prevent the power supply cable 13 and the cable protection chain 14 from interfering with the legs 2, the body of a worker or the like, or an article placed in the vicinity of the desk device 1, due to the lifting and lowering of the top board 3.

As described above, according to the desk device 1 with a height-adjustable top board according to the first embodiment, since the power supply cable 13 is accommodated in the cable protection chain 14 and the wiring duct 16, work of mounting the power supply cable 13 is easy, while there is a simple structure. Moreover, even if the top board 3 is lifted and lowered, the power supply cable 13 and the cable protection chain 14 do not become entangled with each other, and there is no possibility of a worker or articles around the desk device 1 coming into contact with the power supply cable 13 or the cable protection chain 14. Accordingly, workability at the time of use is good and safety can be secured.

Further, since the mounting frame 18 for mounting the wiring duct 16 can be mounted without adding further process to the lower support 9A, it is possible to reduce the number of processes required and the processing costs incurred for mounting the mounting frame 18.

Since substantially the entire circumference of the lower support 9A is covered with the mounting frame 18 and the locking claw portion 21 of the wiring duct 16 can be engaged with the slit 19a of the locking portion 19 formed in the mounting frame 18, the substantially U-shaped wiring duct 16 can be easily mounted on the mounting frame 18 with a simple configuration.

Further, the openings 14b and 16a are formed in the cable protection chain 14 and the wiring duct 16 for guiding the power supply cable 13 from the top board 3 to the floor surface F, respectively, thereby facilitating the insertion and removal of the power supply cable 13. Accordingly, workability at the time of accommodation of the power supply cable 13 is good.

Furthermore, in the power supply cable 13, by providing the wiring of a control unit, a power supply motor, or the like for performing the lifting and lowering driving of the leg members 8 and a power supply socket in the wiring cover 4 for energizing the wiring connected to the electronic device installed on the top board 3 or a cable of the embedded switch 5 or the like as a part of the wiring of the power supply cable 13, there is no possibility of a worker or articles or the like around the desk device 1 coming into contact with the power supply cable 13, workability at the time of usage is good, and safety can be secured.

Further, by giving an arbitrary color to the mounting frame 18 which covers the lower support 9A of the leg member 8, it is possible to perform classification according to the work details, the work floor or the space by color, and many office workers or third parties can easily visually check this classification using the differences in color of the mounting frame 18.

Further, the present invention is not limited to the desk device 1 with a height-adjustable top board according to the above-described first embodiment, and appropriate modifications, substitutions and the like can be made without changing the gist of the present invention, and these modifications and substitutions are also included in the present invention. Other embodiments, modifications and the like of the present invention will be described below. However, a description will be provided using the same reference numerals for components and members the same as or similar to those of the above-described first embodiment.

Next, a desk device 1A with a height-adjustable top board according to a second embodiment of the present invention will be described with reference to FIGS. 6 to 9B.

As shown in FIGS. 6 to 9B, in the desk device 1A with a height-adjustable top board according to the second embodiment, a mounting frame 24 (a decorative member) 24 having, for example, a substantially C-shaped cross section is mounted. The mounting frame 24 covers three surfaces of a lower support 9A of the leg members 8 of the legs 2 and both side portions of a receiving surface 9Aa which is the other surface (which is preferably a surface facing the other leg 2). In the mounting frame 24, the end edges of both end surfaces 24b between which an opening 24a facing the center of the receiving surface 9Aa is formed are bent toward the receiving surface 9Aa.

Figure 6:
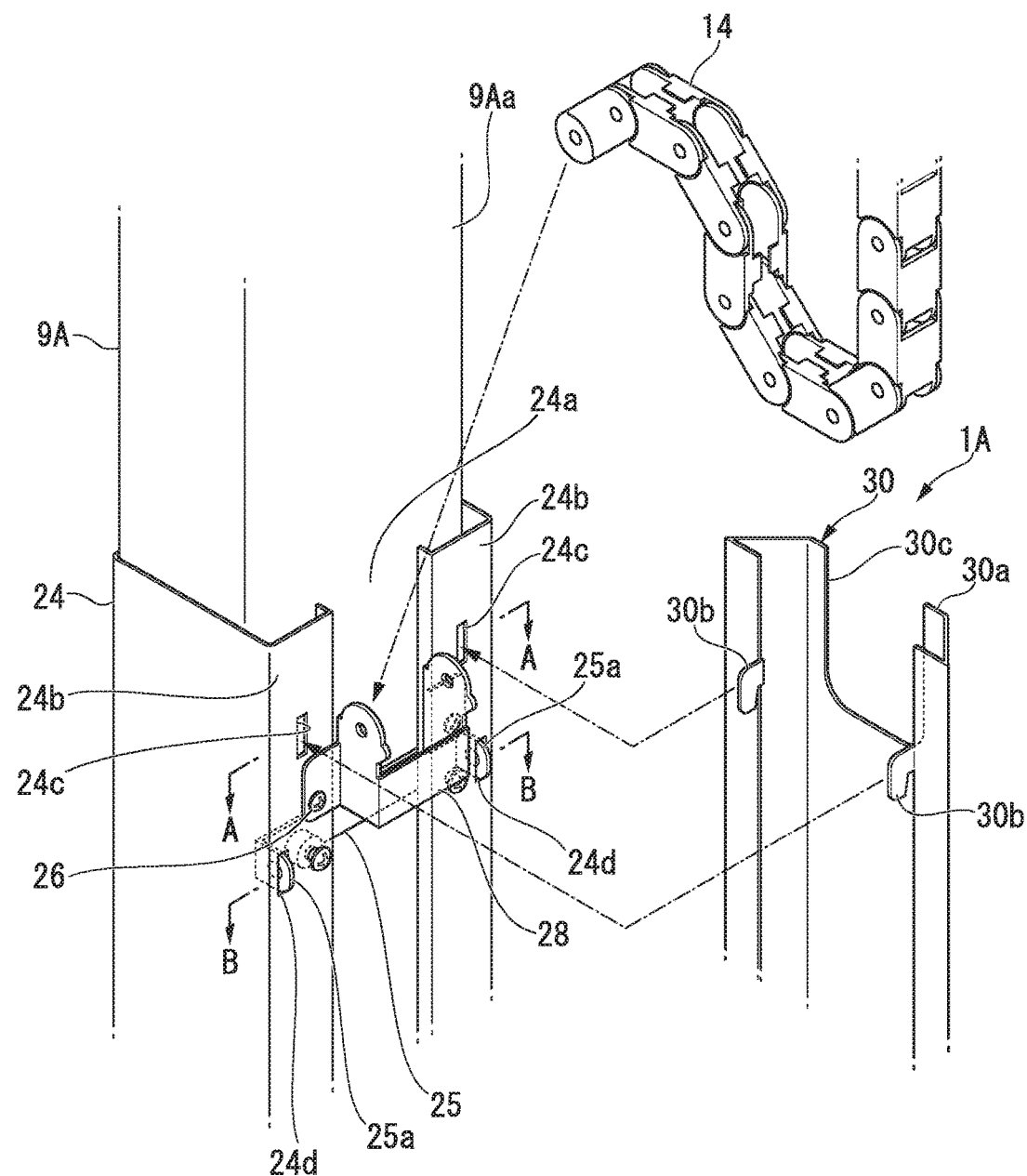
FIG. 6 is an exploded perspective view showing a mounting state of a mounting frame and a cover member in a desk device according to a second embodiment of the present invention.
Figure 9A:
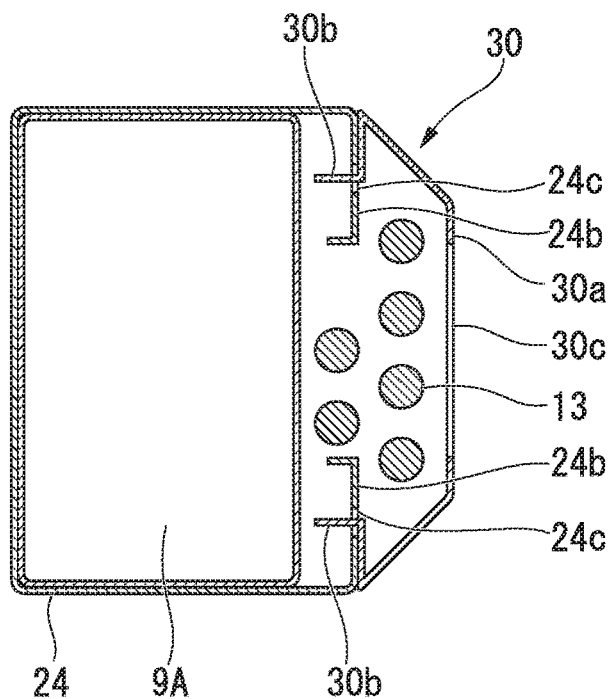
FIG. 9A is a cross-sectional view taken along the line A-A of the mounting frame and the cover member in FIG. 6.
Figure 9B:
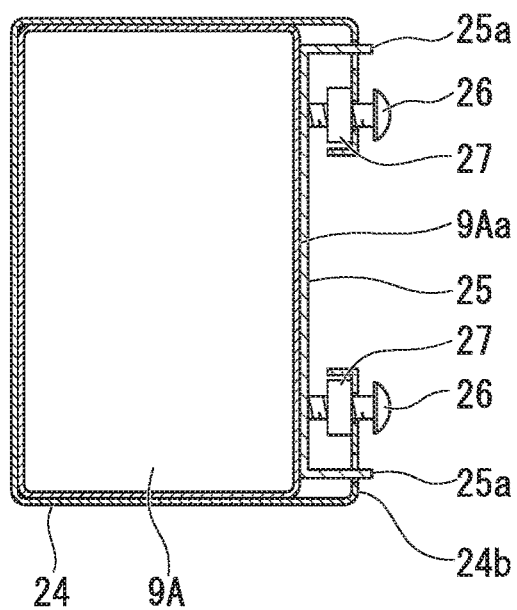
FIG. 9B is a cross-sectional view taken along the line B-B of the mounting frame and the abutting member in FIG. 6.

First vertical insertion grooves 24c (locking portions) are formed on both end surfaces 24b of the mounting frame 24 as slits, and second insertion grooves 24d are similarly formed in the lower portion thereof. In FIGS. 6 and 9B, an abutting member 25 having a substantially U-shaped cross section abuts against the receiving surface 9Aa of the lower support 9A, and both side portions 25a are fitted to the second insertion grooves 24d formed on the both end surfaces 24b of the mounting frame 24, respectively.

Moreover, as shown in FIG. 9B, the bolts 26 are inserted into the second insertion grooves 24d on both end surfaces 24b of the mounting frame 24 and fastened to the nut 27, thereby pressing the abutting member 25 against the receiving surface 9Aa of the lower support 9A.

It is preferable to mount the abutting member 25 on the upper side and the lower side of the mounting frame 24 in the vertical direction, thereby defining a constant width for the opening 24a.

A substantially U-shaped fixing member 28 protruding outward is fixed between the first insertion groove 24c and the second insertion groove 24d on both end surfaces 24b, using the bolts 26 and the nuts 27. Chain segments 14a of the lower end portion of the cable protection chain 14 are rotatably mounted on the both side portions of the fixing member 28 by ring pins P, respectively.

Figure 7:
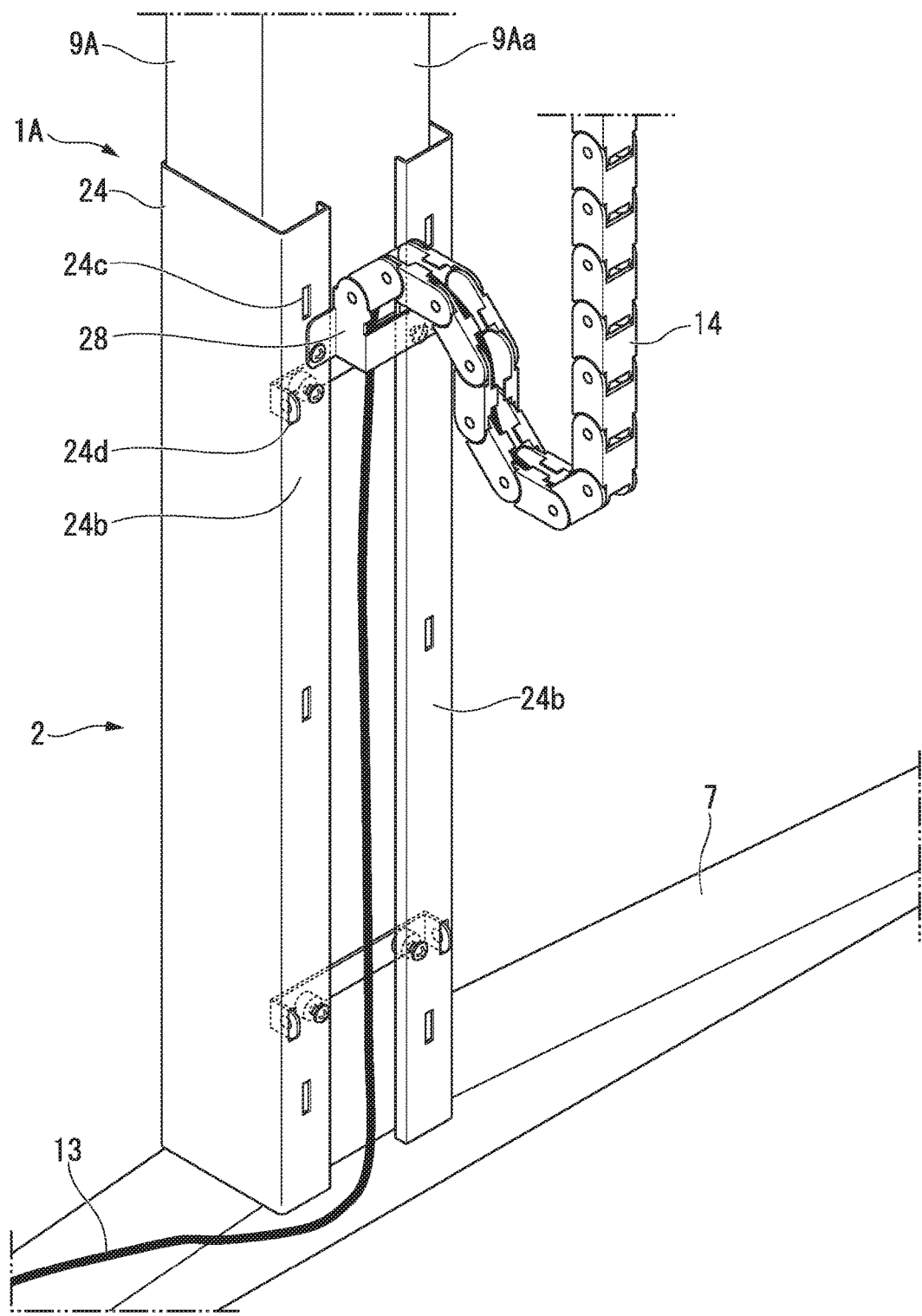
FIG. 7 is a perspective view showing a connecting mechanism of the fixing member and the cable protection chain with respect to the mounting frame excluding the cover member and an abutting member in FIG. 6.

FIG. 7 shows a state in which the chain segments 14a of the lower end portion of the cable protection chain 14 are mounted on the fixing member 28 fixed to the both end surfaces 24b of the mounting frame 24.

Figure 8A:
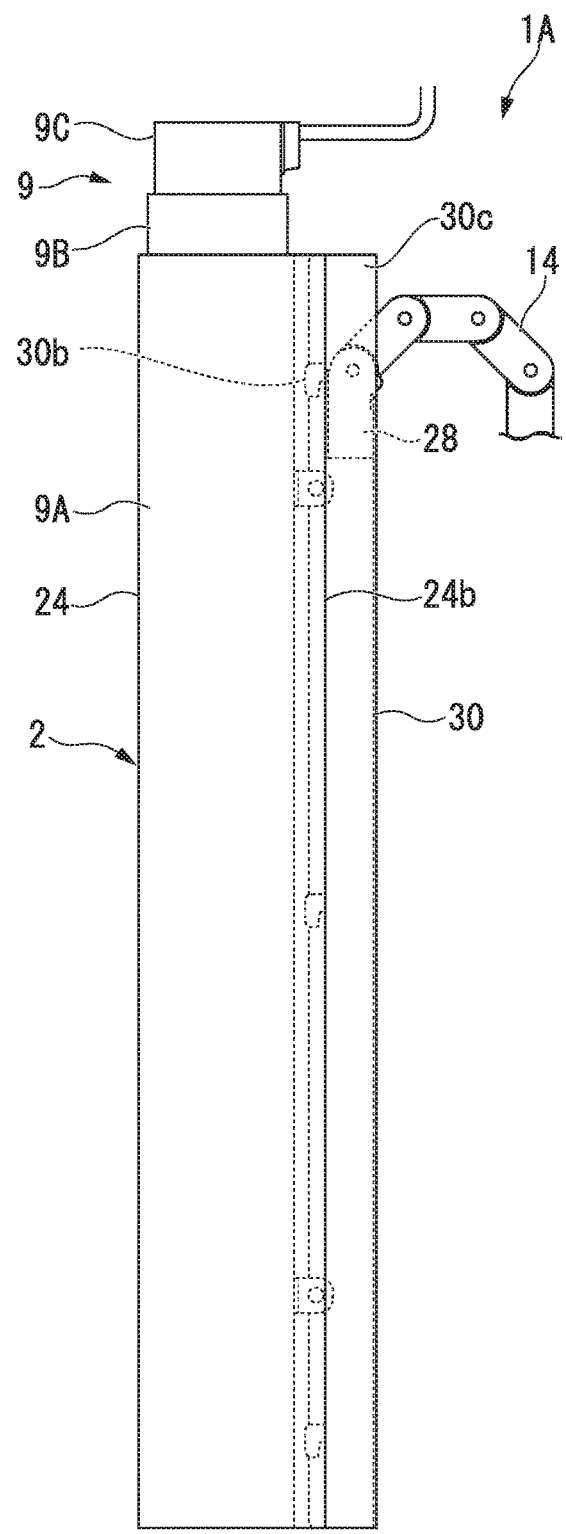
FIG. 8A is a side view showing a state in which the cover member is mounted on the mounting frame.
Figure 8B:
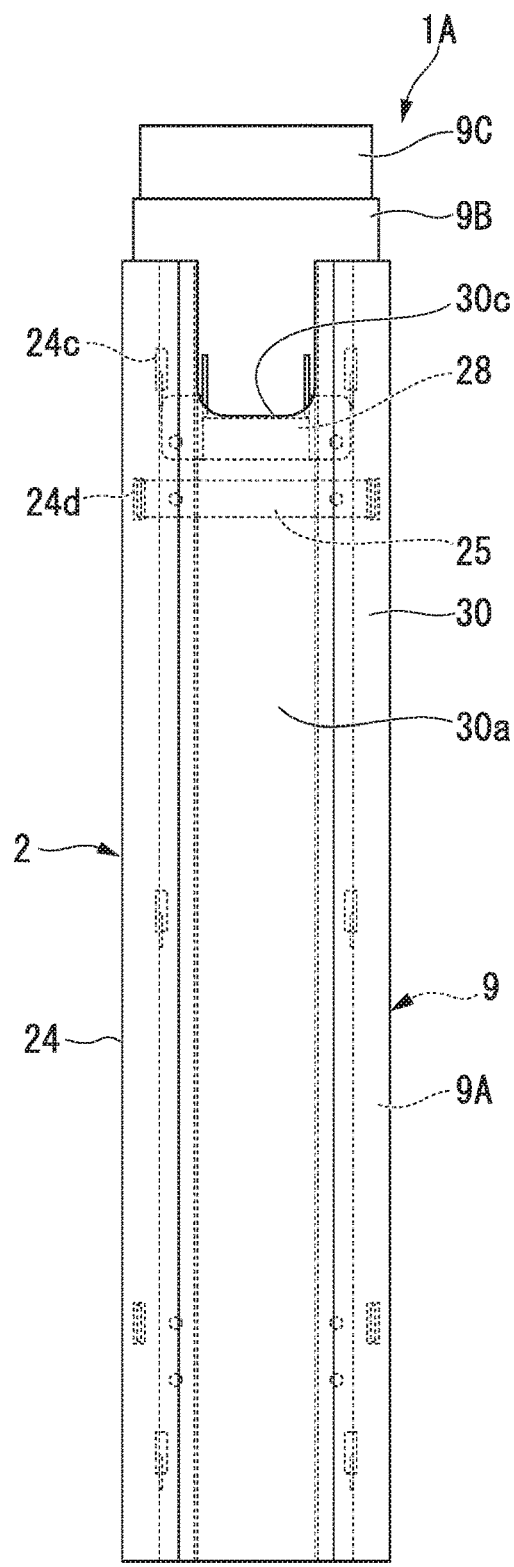
FIG. 8B is a front view showing a state in which the cover member is mounted on the mounting frame.

Further, as shown in FIGS. 6, 8A and 8B, in a state in which the abutting member 25 and the fixing member 28 are fixed to both end surfaces 24b of the mounting frame 24, respectively, the cover member 30 is mounted as a decorative member to cover these members. As shown in FIG. 9A, the cover member 30 includes an outer surface 30a having a flat surface and a tapered surface on the outer side, and a pair of bent pieces of both side portions bent inward, and a locking claw portion 30b as an engaging portion is formed at an end portion of the bent piece.

The cover member 30 can be locked to the mounting frame 24, by inserting the locking claw portions 30b of the cover member 30 into the first insertion grooves 24c formed on both end surfaces 24b of the mounting frame 24. The cover member 30 extends from the upper end to the lower end of the mounting frame 24, the left and right widths are substantially the same width, and the cover member 30 has the same length as the mounting frame 24. In addition, a substantially U-shaped notch 30c for connecting the lower end portion of the cable protection chain 14 to the fixing member 28 is formed on the outer surface 30a of the upper end portion of the cover member 30.

A method for assembling the desk device 1A with a height-adjustable top board according to the second embodiment having the above configuration will be described.

In FIG. 6, the mounting frame 24 is fitted and mounted from the upper part or the lower part of the lower support 9A to surround the lower support 9A. Further, the abutting member 25 is mounted on the upper and lower sides of the mounting frame 24 in the vertical direction, respectively, both side portions 25a of each abutting member 25 are fitted into the second insertion grooves 24d of both end surfaces 24b, the bolts 26 are screwed into the nuts 27 through the insertion holes of both end surfaces 24b, and the abutting member 25 is pressed against the receiving surface 9Aa of the lower support 9A, by pressing the abutting member 25 with the tips of the bolts 26. Accordingly, the opening 24a of the mounting frame 24 can be held at a constant width.

Next, on both end surfaces 24b of the mounting frame 24, the fixing member 28 is mounted to protrude outward between the upper first insertion groove 24c and the lower second insertion groove 24d, and both end surfaces 24b are clamped and fixed using the bolts 26 and the nuts 32. The chain segments 14a of the lower end portion of the cable protection chain 14 are mounted on the fixing member 28, and the ring pins P are fitted from both side portions of the fixing member 28 to support the chain segments 14a.

Finally, the cover member 30 is mounted on the outer side of the fixing member 28, the notch 30c is fitted to the lower side of the cable protection chain 14, and the locking claw portions 30b are fitted into and supported by the upper and lower first insertion grooves 24c of the both end surfaces 24b of the mounting frame 24, respectively.

The desk device 1A according to the second embodiment can also achieve the same operational effects as those of the first embodiment.

Particularly, by coloring the mounting frame 24 and the cover member 30 with different colors for each of the desk devices 1A with a height-adjustable top board, it is possible to identify colors even without directly painting the legs 2 of the desk device 1A for each floor or each space. In addition, depending on the type of coloring, it is possible to easily identify identification targets such as type or details of the office work or the department by color, for each floor, for each space, or in each floor or in a partitioned space.

Further, in each of the embodiments described above, the cable protection chain 14 for protecting the power supply cable 13 in which the bent shape changes in the vertical direction in accordance with the lifting and lowering of the top board 3 is provided as a wiring guide portion. However, the wiring guide portion is not limited to the cable protection chain 14. As long as it is possible to protect and displace the power supply cable 13 which changes a bent shape in accordance with the lifting and lowering of the top board 3, the wiring guide portion may be, for example, a bendable protective member such as a flexible film having a tubular shape or a substantially C-shaped cross section. These protective members and the cable protection chain 14 constitute a wiring guide portion. Further, the wiring guide portion need not necessarily be provided, and the power supply cable 13 hanging down from the top board 3 side may be accommodated in the wiring duct 16, the fixing member 28 and the cover member 30.

In each of the above-described embodiments, the wiring duct 16, the fixing member 28, and the cover member 30, which are connected to the mounting frames 18 and 24 mounted to the lower support 9A to guide the hanging-down position of the power supply cable 13 toward the floor surface F side, constitute a wiring accommodating portion. Further, the mounting frames 18 and 24 constitute a mounting portion.

Further, the mounting frames 18 and 24 are not necessarily required to have a shape which covers or surrounds the lower support 9A. For example, a member including the locking portion 19 may be clamped to the lower support 9A.

In each of the above-described embodiments, the power supply cable 13 hangs down from the top board 3 to the floor surface F. However, in the present invention, a communication cable or the like may be used without there being limitation to the power supply cable 13, and the communication cable and the power supply cable constitute the wiring.

Further, in the engagement structures between the mounting frames 18 or 24 and the wiring duct 16 or the cover member 30 of the first and second embodiments, all of the locking portion 19, the slit 19a and the locking claw portion 21, or the first insertion groove 24c and the locking claw portion 21 in the second embodiment may be provided any of these structures.

In each of the embodiments described above, the wiring structure of the power supply cable 13 in the desk devices with a height-adjustable top board 1 and 1A has been described. However, the present invention is not limited to the desk devices 1 and 1A.

For example, as the height-adjustable top board 3, a table device, a counter device and the like may be used instead of the desk device 1. These are included as a furniture device with a height-adjustable top board.

INDUSTRIAL APPLICABILITY

According to the furniture device with a height-adjustable top board of the present invention, it is possible to easily identify the type, the details or the like of the office work or subject for each floor or for each partitioned space, or in each floor and partitioned space using a simple method.

In addition, according to the furniture device with a height-adjustable top board of the present invention, it is possible to reduce the number of processes required and the processing costs incurred for installation of the wiring, and high operability and safety can be secured.

REFERENCE SIGNS LIST 1, 1A Desk device
2 Leg
3 Top board
8 Leg member
9A lower support
13 Power supply cable
14 Cable protection chain
16 Wiring duct
18, 24 Mounting frame (decorative member)
19 Locking portion
19a Slit
21, 30b Locking claw portion
24c First insertion groove
24d Second insertion groove
25 Abutting member
28 Fixing member
30 Cover member

The invention claimed is:

1. A furniture device with a height-adjustable top board, the furniture device comprising:
   a top board;
   extendable and contractable legs equipped with an upper support configured to support the top board, and a lower support configured to support the upper support to be movable upward and downward;
   a mounting portion mounted on the lower support; and
   a wiring accommodating portion which is mounted on an outer surface of the mounting portion and accommodates wiring extending from a side of the top board inside the wiring accommodating portion,
   wherein the mounting portion constitutes a decorative member which covers the lower support and to which an arbitrary color is given.

2. The furniture device with a height-adjustable top board according to claim 1, wherein substantially the entire periphery of the lower support is covered with the mounting portion.

3. The furniture device with a height-adjustable top board according to claim 1, further comprising:
   a wiring guide portion which accommodates the wiring extending from the top board to the wiring accommodating portion and is displaceable, while being bent in accordance with lifting and lowering of the top board,
   wherein an end portion of the wiring guide portion far from the top board is mounted on the wiring accommodating portion.

4. The furniture device with a height-adjustable top board according to claim 1, wherein an engaging portion provided in the wiring accommodating portion is engaged with a locking portion provided in the mounting portion.

5. The furniture device with a height-adjustable top board according to claim 4, wherein the mounting portion surrounds substantially the entire periphery of the lower support, and
   one of the locking portion provided in the mounting portion and the engaging portion provided in the wiring accommodating portion is a slit, and the other of the locking portion and the engaging portion is a locking claw portion which is formed in a L-shape and engageable with the slit to accommodate a lower end of the slit inside the locking claw portion.

6. The furniture device with a height-adjustable top board according to claim 1, wherein
   the mounting portion is provided with an opening extending in a vertical direction,
   the wiring accommodating portion includes:
      a wiring duct formed in a substantially U-shaped cross section and mounted on the mounting portion to cover the opening, and
   the wiring duct constitutes the decorative member.

7. The furniture device with a height-adjustable top board according to claim 1, wherein
   the mounting portion is provided with an opening extending in a vertical direction, the wiring accommodating portion includes:
  a fixing member formed in a substantially U-shaped cross section and mounted on the mounting portion to cover the opening; and
  a cover member formed in a substantially U-shaped cross section and mounted on the mounting portion to cover the fixing member, and
the cover member constitutes the decorative member.

* * * * *